US010341134B2

(12) United States Patent
Choi et al.

(10) Patent No.: US 10,341,134 B2
(45) Date of Patent: Jul. 2, 2019

(54) SYSTEM AND METHOD FOR ISOLATING DEVICE COMMUNICATIONS IN A BACNET/IP BUILDING AUTOMATION NETWORK

(71) Applicant: Siemens Schweiz AG, Zürich (CH)

(72) Inventors: William Choi, Lake Zurich, IL (US); Andreas Schlumberger, Baar (CH); Gerhard Brun, Lucerne (CH)

(73) Assignee: SIEMENS SCHWEIZ AG, Zürich (CH)

( * ) Notice: Subject to any disclaimer, the term of this patent is extended or adjusted under 35 U.S.C. 154(b) by 70 days.

(21) Appl. No.: 15/683,184

(22) Filed: Aug. 22, 2017

(65) Prior Publication Data
US 2018/0375681 A1    Dec. 27, 2018

Related U.S. Application Data

(60) Provisional application No. 62/523,009, filed on Jun. 21, 2017.

(51) Int. Cl.
| | |
|---|---|
| H04L 12/18 | (2006.01) |
| H04L 12/701 | (2013.01) |
| H04L 12/28 | (2006.01) |
| H04L 29/06 | (2006.01) |
| H04L 12/40 | (2006.01) |
| H04L 29/08 | (2006.01) |

(52) U.S. Cl.
CPC .......... *H04L 12/2838* (2013.01); *H04L 12/18* (2013.01); *H04L 12/1886* (2013.01);
(Continued)

(58) Field of Classification Search
CPC ............. H04L 12/2838; H04L 61/1552; H04L 69/16; H04L 69/164
See application file for complete search history.

(56) References Cited

U.S. PATENT DOCUMENTS

| | | | |
|---|---|---|---|
| 2014/0173581 A1* | 6/2014 | Grinberg ................ | G06F 8/654 |
| | | | 717/170 |
| 2015/0039752 A1* | 2/2015 | Hague ................. | H04L 12/2803 |
| | | | 709/224 |

(Continued)

FOREIGN PATENT DOCUMENTS

EP    1331756 A2    7/2003

OTHER PUBLICATIONS

"BASrouters—BACnet Routing Examples", pp. 1-20, https://web.archive.org/web/20151010122703/http://www.ccontrols.com:80/pdf/AGBASRTB00.pdf, archived on Oct. 10, 2015 (Year: 2015).*

(Continued)

*Primary Examiner* — Scott M Sciacca

(57) ABSTRACT

A building automation system and method is provided for isolating device communications in a BACnet/IP building automation network. The system may comprise at least one processor in a BACnet device configured via executable instructions included in at least one memory to communicate UDP messages for field devices onto an Ethernet network for receipt by at least one other BACnet device on the Ethernet network. The at least one processor may be configured to receive and store in a memory a configurable local subnet, a BACnet/IP UDP port, and a local UDP port. The at least one processor may also be configured to determine a UDP message that is to be broadcast only on the local subnet. In addition, the at least one processor may be responsive to the determination, to broadcast the UDP message to BACnet devices on the same local subnet using the local UDP port stored in the memory.

11 Claims, 4 Drawing Sheets

(52) U.S. Cl.
CPC .... *H04L 12/2832* (2013.01); *H04L 12/40091* (2013.01); *H04L 67/12* (2013.01); *H04L 69/164* (2013.01); *H04L 2012/4026* (2013.01)

(56) References Cited

U.S. PATENT DOCUMENTS

| | | | | |
|---|---|---|---|---|
| 2015/0207773 | A1* | 7/2015 | Matsen | H04L 61/1552 |
| | | | | 709/202 |
| 2018/0123925 | A1* | 5/2018 | Sinha | H04L 43/0817 |

OTHER PUBLICATIONS

Newman H. et al: "Broadcast inq BACnet", ASHARE Journal, pp. 8-12, XP055161039, Internet, Retrieved from the Internet: URL:http://www.bacnet.org/Bibliography/BACnet-Today-10/Newman 2010.pdf [retrieved on Jan. 9, 2015], figures 2, 3, Broadcasting in BACnet/IP; p. B11, left-hand column, line 3—right-hand column, line 26.

Reindl Douglas T. et al: "ANSI/ASHRAE Addendum o to ANSI/ASHRAE Standard 135-2008 BACnet—A Data Communication Protocol for Building Automation and Control Networks", pp. 1-10, XP055495212, 1791 Tullie Circle NE, Atlanta, GA 30329 Retrieved from the Internet: URL:http://www.bacnet.org/Addenda/Add-135-2008o.pdf, [retrieved on Jul. 25, 2018], figures J-XI, J-X2, p. 2, line 32-p. 6, line 37.

PCT International Search Report and Written Opinion of International Searching Authority dated Aug. 3, 2018 corresponding to PCT International Application No. PCT/EP2018/064923 filed Jun. 6, 2018.

* cited by examiner

SYSTEM AND METHOD FOR ISOLATING DEVICE COMMUNICATIONS IN A BACNET/IP BUILDING AUTOMATION NETWORK

TECHNICAL FIELD

The present disclosure is directed, in general, to building automation systems that are used to control devices in a building such as HVAC equipment, blind actuators, and lighting actuators.

BACKGROUND

Building automation systems provide communication between and control of devices in a building. Such systems may benefit from improvements.

SUMMARY

Variously disclosed embodiments include building automation systems and methods that may be used to facilitate isolating device communications in a BACnet/IP building automation network. In one example, a system may comprise at least one processor in a BACnet device configured via executable instructions included in at least one memory to communicate UDP messages for field devices onto an Ethernet network for receipt by at least one other BACnet device on the Ethernet network. The at least one processor may be configured to receive and store in a memory a configurable local subnet, a BACnet/IP UDP port, and a local UDP port. The at least one processor may also be configured to determine a UDP message that is to be broadcast only on the local subnet. In addition, the at least one processor may be responsive to the determination, to broadcast the UDP message to BACnet devices on the same local subnet using the local UDP port stored in the memory.

In another example, a method for isolating device communications in a BACnet/IP building automation network may comprise acts carried out through operation of at least one processor that correspond to the functions for which the previously described at least one processor is configured to carry out.

A further example may include a non-transitory computer readable medium encoded with executable instructions (such as a software component on a storage device) that when executed, causes the devices to carry out this described method.

Another example may include a product or apparatus including at least one hardware, software, and/or firmware based processor, computer, component, controller, means, module, and/or unit configured for carrying out functionality corresponding to this described method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Figure 1:
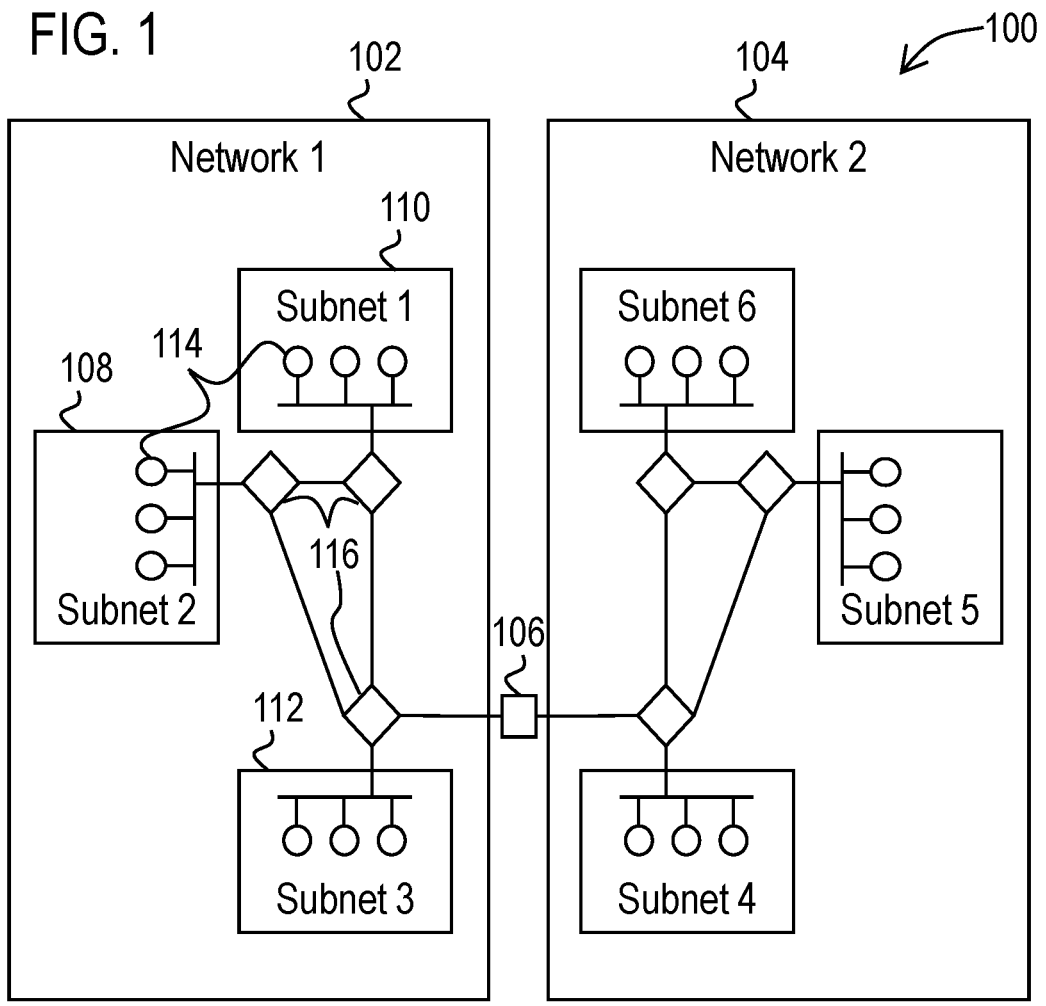
FIG. 1 illustrates a functional block diagram of a building automation system.

Various technologies that pertain to systems and methods that facilitate isolating device communications in a BACnet/IP building automation network will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

FIG. 1 illustrates an example network topology for a building automation system 100. The network topology may include a plurality of Ethernet networks 102, 104 connected via a BACnet/IP router 106. Each network may include a plurality of subnets 108, 110, 112 that each include a plurality of BACnet devices 114.

An example of such a BACnet 114 device may include a BACnet room controller such as a Siemens DXR2 and/or PXC3 room automation stations provided by Siemens Switzerland Ltd, of Zug, Switzerland. As illustrated in the example system 200 of FIG. 2, a BACnet device 114 may include at least one application such as a communication component 202 executed by a processor 204 via accessing firmware/software executable instructions 206 from a memory 208. Such a communication component 202 facilitates communication of messages between a BACnet/IP network 102 (e.g., an Ethernet IP network) and building technology field devices 210 such as HVAC (heating, ventilation, and air-conditioning), lighting, and shading equipment (actuators, sensors) that are connected to the BACnet/IP device (such as via a KNX PL-Link bus).

As illustrated in FIG. 1, a BACnet/IP network topology of a building automation system 100 may be configured to communicate messages over multiple IP subnets 108, 110, 112. To accomplish this, one or more BACnet Broadcast Management Devices (BBMDs) 116 may be used to forward and redistribute a BACnet local broadcasted messages to all other BBMDs and associated subnets of the same network.

However, in order to limit the need for unnecessary devices to process non-applicable messages broadcast on a BACnet/IP network, such BACnet broadcasted messages may be isolated to those devices on a specific IP subnet. In one approach to carry this out, physical BACnet routers may be located on each IP subnet to drop local broadcast messages. However, the use of BACnet routers adds costs and complexity to a jobsite.

In another approach, IP Multicast could be used. However, this also adds additional complexity to the jobsite. Further, network administrators may prohibit use of IP Multicast. In addition, there may be a technical conflict. For example, the use of IP Multicast for a BACnet/IP port is an implementation option by the BACnet standard (clause J.8) that prevents the broadcast isolation.

Figure 2:
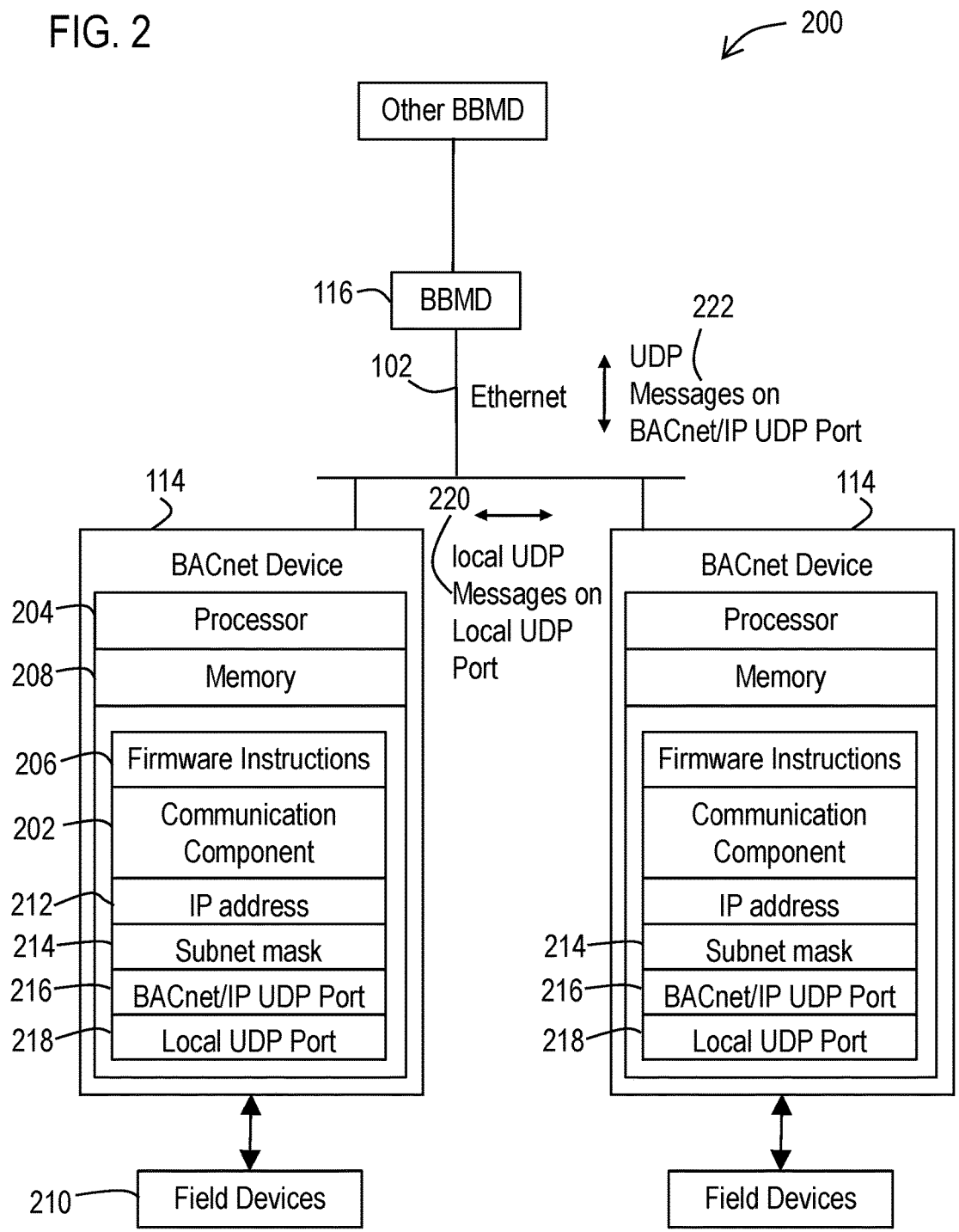
FIG. 2 illustrates a functional block diagram of an example system that facilitates isolating device communications in a BACnet/IP building automation network.

The following described examples provide a further approach to isolate broadcasts to devices on a common subnet that is carried out via an enhancement to the communication component 202 of a BACnet device 114. In this example as illustrated in FIG. 2, a BACnet device 114 may be adapted to store and use one or more configurable local User Datagram Protocol (UDP) port(s) 218 that allow the device to communicate to other BACnet devices on its local subnet without such communications being forwarded by BBMD devices 116 to BACnet devices on other subnets. Such a local UDP port 218 is in addition to an existing BACnet/IP UDP port 216 stored in the BACnet device that is used to broadcast messages 222 beyond the local subnet (e.g., via a BBMD 116 for example).

The described communication component 202 may be adapted, for example, to receive and store such a local UDP port 218 (in addition to a BACnet/IP IP address 212, a local subnet mask 214, and the BACnet/IP UDP port 216). Such parameters may be stored, for example, in a non-volatile memory of the BACnet device 114 (such as the memory 208 or other memory of the device). In this example, the BACnet/IP UDP port 216, for example, may correspond to a port number (different than the local UDP port) via which broadcast UDP messages 222 are received from and sent to the BBMD 116 associated with the subnet.

Each BACnet device 114 may receive and send local UDP messages 220 that are determined to be local messages (only for devices on the local subnet), using the local UDP port 216 to communicate to other BACnet devices 114 on its local subnet. This prevents broadcasts from overloading all of the subnets. Broadcasts of messaged determined by the at least one processor to be destined for a single subnet, will only be seen by those devices on that subnet, based on using the local UDP port stored in the memory of the BACnet device.

An example of such locally broadcast UDP messages may include messages that are determined to correspond to a device health message or any other type of message that is intended only for devices on the local subnet. A device heath message, for example, denotes a local broadcast on the network indicating the health of the device and if the device is OK, it may include any properties that have been read. Such properties, for example, may include: system status, last restore time, time of device restart, firmware revision, model name, vendor ID, max APDU length, segmentation supported, max segments accepted, APDU timeout, Max APDU length, object ID, protocol services supported, 51 active language, 51 device features, or any combination thereof.

In this example, two or more BACnet devices 114 on a common subnet for which this functionality is desired, will have their local UDP ports configured to have the same port number. In an example embodiment, a BACnet device on the subnet may leave the local UDP port unconfigured (or disabled), which causes the BACnet device to not receive/send such local broadcasts. Also, a BACnet communication component with the knowledge that all peers reside on the local IP subnet may be configured to use a local UDP port automatically. Conversely, messages that are not determined to be limited to local delivery to devices on the same subnet, may be communicated using the BACnet/IP UDP port 216 (which communicates the message to other subnets via a BBMD 116. Such a BBMD 116 may be configured to listen for messages to communicate on the same BACnet/IP UDP port 216, but would not be configured to listen for messages to communicate on the local UDP port 218.

This described example may achieve reduced overhead on the entire BACnet/IP network and may reduce performance overhead on BBMD's for messages that do not have to be forwarded (without using additional BACnet routers 106 to isolate the subnetworks). Further, this described approach may allow larger BACnet/IP systems to be assembled, as broadcasts are kept local where possible and the potential for overall broadcast storms is reduced. Also, this described approach permits larger BACnet/IP systems to be engineered according to IP subnet boundaries.

Figure 3:
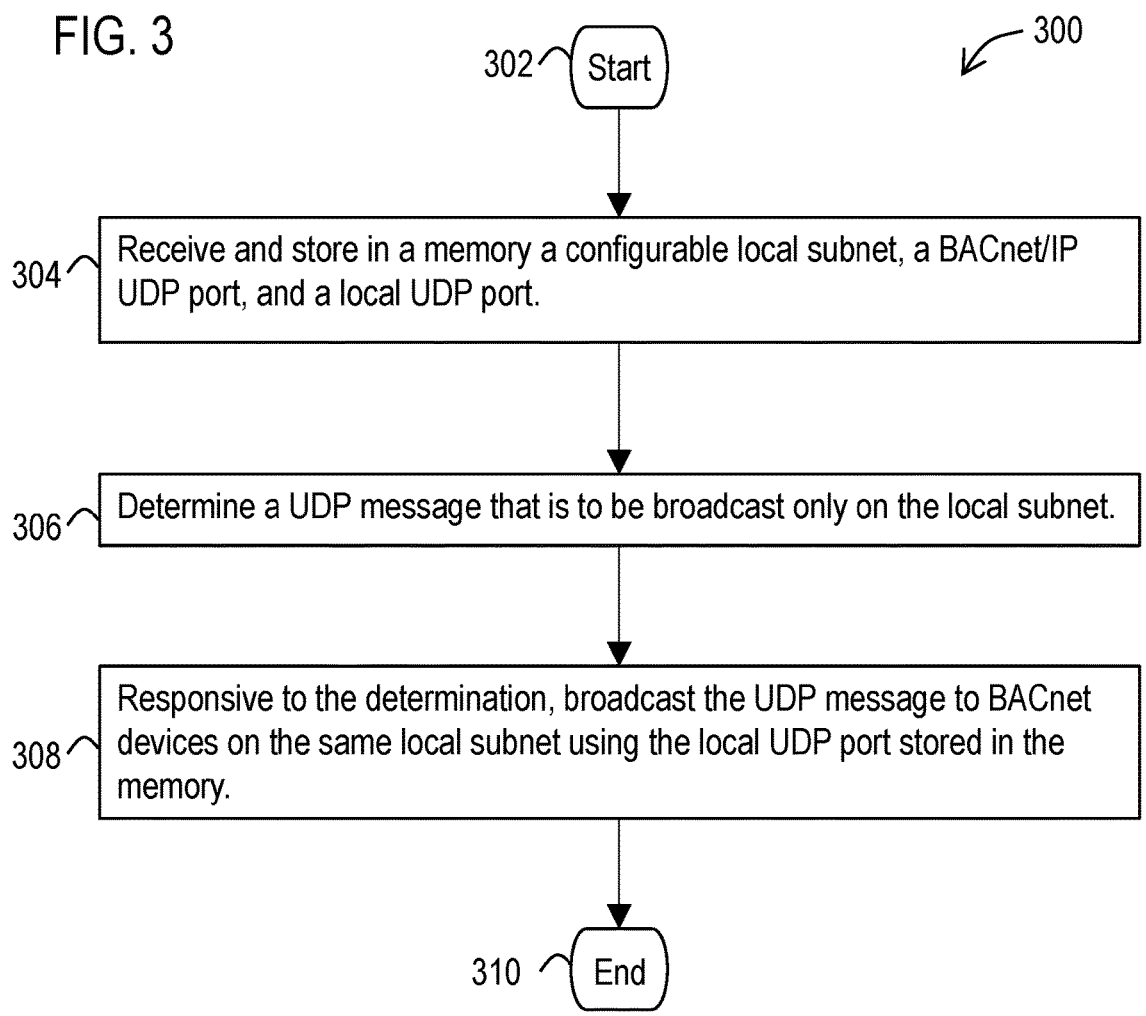
FIG. 3 illustrates a flow diagram of an example methodology that facilitates isolating device communications in a BACnet/IP building automation network.

Referring now to FIG. 3, a methodology 300 is illustrated that facilitates isolating device communications in a BACnet/IP building automation network. While the methodology is described as being a series of acts that are performed in a sequence, it is to be understood that the methodology may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The methodology may start at 302 and may include several acts carried out through operation of at least one processor in a BACnet device configured via executable instructions included in at least one memory to communicate UDP messages for field devices onto an Ethernet network for receipt by at least one other BACnet device on the Ethernet network. These acts may include an act 304 of receiving and storing in a memory a configurable local subnet, a BACnet/IP UDP port, and a local UDP port. These acts may also include an act 306 of determining a UDP message that is to be broadcast only on the local subnet. In addition, these acts may include an act 308 of responsive to the determination, broadcasting the UDP message to BACnet devices on the same local subnet using the local UDP port stored in the memory. At 310 the methodology may end.

Also, it should be appreciated that this described methodology may include additional acts and/or alternative acts corresponding to the features described previously with respect to the BACnet device 114 and network topology 100.

For example, as discussed previously, the field devices correspond to at least one of HVAC, lighting, and/or shading equipment. The UDP messages may be associated with the field devices. The UDP message, for example, may include a device health message that specifies a status associated with a device. Such a device health message may also include properties that have been read from the device including at least one of: system status, last restore time, time of device restart, firmware revision, model name, vendor ID, max APDU length, segmentation supported, max segments accepted, APDU timeout, Max APDU length, object ID, protocol services supported, S1 active language, S1 device features, or any combination thereof.

In addition, the methodology may comprise acts carried out through operation of respective at least one processors in a first plurality of the BACnet devices, each connected to the Ethernet network and respective field devices, and each configured with a same first subnet address and same first local UDP port. These acts may include locally broadcasting messages limited to being received by the first plurality of the BACnet devices, based on the same first local UDP port stored in the respective memories of the BACnet devices.

In addition, the methodology may comprise acts carried out through operation of a first BACnet broadcast management device (BBMD) connected to the Ethernet network. Such acts may include forwarding UDP messages associated with the BACnet/IP UDP port from each of the first plurality of BACnet devices to a second BBMD associated with a second subnet. Such acts may also include not forwarding the UDP messages for the local UDP port to the second BBMD associated with the second subnet.

In an example embodiment, a second plurality of the BACnet devices may be connected to the Ethernet network and respective field devices, and each may be configured with the same second subnet address and a same second local UDP port. In this example the first and second subnet address are different and locally broadcast messages are limited to being received by the first plurality of the BACnet devices and not the second plurality of BACnet devices, based on the same first local UDP port stored in the respective memories of the first plurality of BACnet devices, wherein the BACnet/IP UDP port is different than the local UDP port.

As discussed previously, acts associated with the above-described methodologies (other than any described manual acts) may be carried out by one or more processors 204 included in a BACnet device 114 or any other type of data processing systems with corresponding functionality. Such processor(s) may execute from at least one memory 208 executable instructions 206 (such as software/firmware instructions) that are operative to cause the described acts/functions to be carried out by the one or more processors.

Also, as used herein a processor corresponds to any electronic device that is configured via hardware circuits, software, and/or firmware to process data. For example, processors described herein may correspond to one or more (or a combination) of a microprocessor, CPU, or any other integrated circuit (IC) or other type of circuit that is capable of processing data in a data processing system. It should be understood that a processor that is described or claimed as being configured to carry out a particular described/claimed process or function may: correspond to a CPU that executes computer/processor executable instructions stored in a memory in the form of software and/or firmware to carry out such a described/claimed process or function; and/or may correspond to an IC that is hard wired with processing circuitry (e.g., an FPGA or ASIC IC) to carry out such a described/claimed process or function.

It should also be understood that a processor that is described or claimed as being configured to carry out a particular described/claimed process or function may correspond to the combination of the processor with the software/firmware instructions loaded/installed into the described memory (volatile and/or non-volatile), which are currently being executed and/or are available to be executed by the processor to cause the processor to carry out the described/claimed process or function. Thus, a processor that is powered off or is executing other software/firmware, but has the described software/firmware instructions installed on a storage device in operative connection therewith (such as in a nonvolatile memory) in a manner that is setup to be executed by the processor (when started by a user, hardware and/or other software), may also correspond to the described/claimed processor that is configured to carry out the particular processes and functions described/claimed herein.

Further the phrase "at least one" before an element (e.g., a processor) that is configured to carry out more than one function/process may correspond to one or more elements (e.g., processors) that each carry out the functions/processes and may also correspond to two or more of the elements (e.g., processors) that respectively carry out different ones of the one or more different functions/processes.

It is important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., the described software and/or firmware instructions) contained within a non-transitory machine-usable, computer-usable, or computer-readable medium in any of a variety of forms, and that the present disclosure applies equally regardless of the particular type of instruction or data bearing medium or storage medium utilized to actually carry out the distribution. Examples of non-transitory machine usable/readable or computer usable/readable mediums include: ROMs, EPROMs, magnetic tape, hard disk drives, SSDs, flash memory, CDs, DVDs, and Blu-ray disks. The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly language, Java, JavaScript, Python, C, C#, C++ or any other form of code that can be programmed/configured to cause at least one processor to carry out the acts and features described herein. Still further, results of the described/claimed processes or functions may be stored in a computer-readable medium, displayed on a display device, and/or the like.

Figure 4:
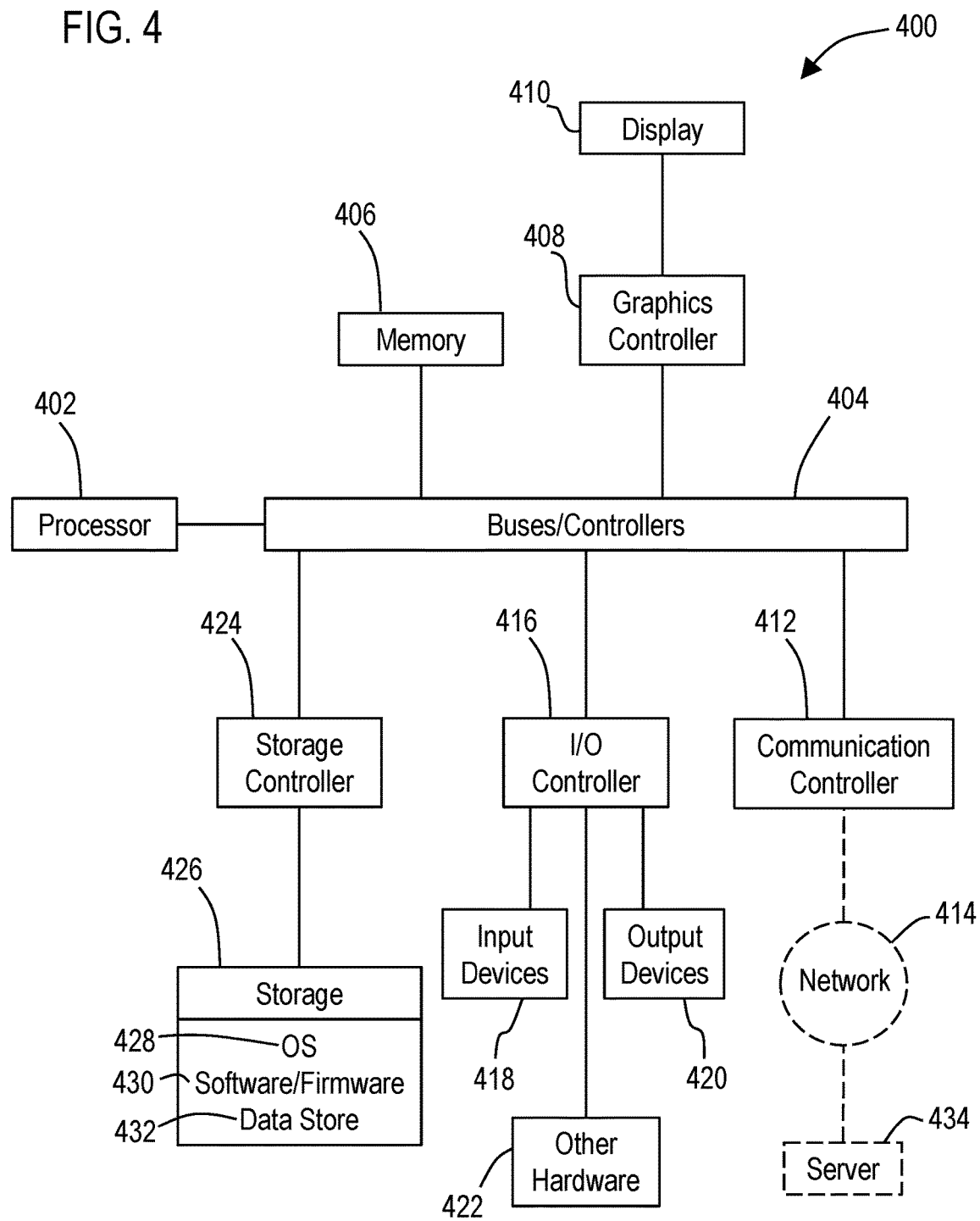
FIG. 4 illustrates a block diagram of a data processing system in which an embodiment may be implemented.

FIG. 4 illustrates a block diagram of a data processing system 400 (e.g., a computer or controller) in which an embodiment can be implemented for some types of the devices described herein and/or other system operatively configured by computer/processor executable instructions, circuits, or otherwise to perform the functions and processes as described herein. The data processing system depicted includes at least one processor 402 (e.g., a CPU) that may be connected to one or more bridges/controllers/buses 404 (e.g., a north bridge, a south bridge). One of the buses 404, for example, may include one or more I/O buses such as a PCI Express bus. Also connected to various buses in the depicted example may include a main memory 406 (RAM) and a graphics controller 408. The graphics controller 408 may be connected to one or more display devices 410 (e.g., LCD or AMOLED display screen, monitor, VR headset, and/or projector). It should also be noted that the processor 402 may include a CPU cache memory. Further, in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 412 (Ethernet controllers, WiFi controllers, cellular controllers) operative to connect to a local area network (LAN), Wide Area Network (WAN), a cellular network, and/or other wired or wireless networks 414 or communication equipment.

Further components connected to various busses may include one or more I/O controllers 416 such as USB controllers, Bluetooth controllers, and/or dedicated audio controllers (connected to speakers and/or microphones). It should also be appreciated that various peripherals may be connected to the I/O controller(s) (via various ports and connections) including input devices 418 (e.g., keyboard, mouse, pointer, touch screen, touch pad, drawing tablet, trackball, buttons, keypad, game controller, gamepad, camera, microphone, scanners, motion sensing devices that capture motion gestures), output devices 420 (e.g., printers, speakers) or any other type of device that is operative to provide inputs to or receive outputs from the data processing system.

Also, it should be appreciated that many devices referred to as input devices or output devices may both provide inputs and receive outputs of communications with the data processing system. For example, the processor 402 may be integrated into a housing (such as a tablet) that includes a touch screen that serves as both an input and display device. Further, it should be appreciated that some input devices (such as a laptop) may include a plurality of different types of input devices (e.g., touch screen, touch pad, and keyboard). Also, it should be appreciated that other peripheral hardware 422 connected to the I/O controllers 416 may include any type of device, machine, or component that is configured to communicate with a data processing system.

Additional components connected to various busses may include one or more storage controllers 424 (e.g., SATA). A storage controller may be connected to a storage device 426 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 404 such as a PCI Express bus.

A data processing system in accordance with an embodiment of the present disclosure may include an operating system 428, software/firmware 430, and data stores 432 (that may be stored on a storage device 426 and/or the memory 406). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 412 may be connected to the network 414 (which may or may not be a part of a data processing system 400), which can be any local, wide area, remote, private, and/or public data processing system network or combination of networks, as known to those of skill in the art, including the Internet. Data processing system 400 can communicate over the network 414 with one or more other data processing systems such as a server 434 (which may in combination correspond to a larger data processing system). For example, a larger data processing system may correspond to a plurality of smaller data processing systems implemented as part of a distributed system in which processors associated with several smaller data processing systems may be in communication by way of one or more network connections and may collectively perform tasks described as being performed by a single larger data processing system. Thus, it is to be understood that when referring to a data processing system, such a system may be implemented across several data processing systems organized in a distributed system in communication with each other via a network.

It should also be understood that the term "controller" means any device, system or part thereof that controls at least one operation, whether such a device is implemented in hardware, firmware, software or any combination thereof. It should be noted that the functionality associated with any particular controller may be centralized or distributed, whether locally or remotely. The described processor and memory may be included in a controller. Further, a controller may correspond to the described data processing system or any other hardware circuit that is operative to control at least one operation.

In addition, it should be appreciated that data processing systems may include virtual machines in a virtual machine architecture or cloud environment. For example, the processor 402 and associated components may correspond to the combination of one or more virtual machine processors of a virtual machine operating in one or more physical processors of a physical data processing system. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 400 in this example may correspond to a controller, computer, workstation, server, PC, notebook computer, tablet, mobile phone, and/or any other type of apparatus/system that is operative to process data and carry out functionality and features described herein associated with the operation of a data processing system, computer, processor, software components, and/or a controller discussed herein. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of the data processing system 400 may conform to any of the various current implementations and practices known in the art.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A system for isolating device communications in a BACnet over Internet Protocol (BACnet/IP) building automation network comprising:
   at least one processor in a BACnet device configured via executable instructions included in at least one memory to communicate user datagram protocol (UDP) messages for field devices onto an Ethernet network for receipt by at least one other BACnet device on the Ethernet network, wherein the at least one processor is configured to:
      receive and store in a memory a configurable local subnet, a BACnet/IP UDP port, and a local UDP port;
      determine a UDP message that is to be broadcast only on the local subnet; and
      responsive to the determination, broadcast the UDP message to BACnet devices on the same local subnet using the local UDP port stored in the memory,
   wherein the field devices correspond to at least one of heating, ventilation and air conditioning (HVAC), lighting, and/or shading equipment,
   further comprising a first plurality of the BACnet devices, each connected to the Ethernet network and respective field devices, and each configured with a same first subnet address and same first local UDP port, wherein locally broadcast messages are limited to being received by the first plurality of the BACnet devices, based on the same first local UDP port stored in the respective memories of the BACnet devices, and
   further comprising a first BACnet broadcast management device (BBMD) connected to the Ethernet network and configured to:
      forward UDP messages associated with the BACnet/IP UDP port from each of the first plurality of BACnet devices to a second BBMD associated with a second subnet;
      not forward the UDP messages for the local UDP port to the second BBMD associated with the second subnet.

2. The system according to claim 1, wherein the UDP message includes a device health message that specifies a status associated with a device.

3. The system according to claim 2, wherein the device health message includes properties that have been read from the device including at least one of: system status, last restore time, time of device restart, firmware revision, model name, vendor ID, max application protocol data unit (APDU) length, segmentation supported, max segments accepted, APDU timeout, object ID, protocol services supported, S1 active language, S1 device features, or any combination thereof.

4. The system according to claim 1, further comprising:
   the second BBMD; and
   a second plurality of the BACnet devices, each connected to the Ethernet network and respective field devices, and each configured with the same second subnet address and a same second local UDP port, which first and second subnet addresses are different,
   wherein locally broadcast messages are limited to being received by the first plurality of the BACnet devices and not the second plurality of BACnet devices, based on the same first local UDP port stored in the respective memories of the first plurality of BACnet devices, wherein the BACnet/IP UDP port is different than the local UDP port.

5. A method for isolating device communications in a BACnet over Internet Protocol (BACnet/IP) building automation network comprising:
   through operation of at least one processor in a BACnet device configured via executable instructions included in at least one memory to communicate user datagram protocol (UDP) messages for field devices onto an Ethernet network for receipt by at least one other BACnet device on the Ethernet network:

receiving and storing in a memory a configurable local subnet, a BACnet/IP UDP port, and a local UDP port;

determining a UDP message that is to be broadcast only on the local subnet; and responsive to the determination, broadcasting the UDP message to BACnet devices on the same local subnet using the local UDP port stored in the memory, wherein the field devices correspond to at least one of heating, ventilation and air conditioning (HVAC), lighting, and/or shading equipment, further comprising through operation of respective at least one processor in a first plurality of the BACnet devices, each connected to the Ethernet network and respective field devices, and each configured with a same first subnet address and same first local UDP port:

locally broadcasting UDP messages limited to being received by the first plurality of the BACnet devices, based on the same first local UDP port stored in the respective memories of the BACnet devices, wherein the UDP message includes a device health message that specifies a status associated with a device, and further comprising:

through operation of a first BACnet broadcast management device (BBMD) connected to the Ethernet network:

forwarding UDP messages associated with the BACnet/IP UDP port from each of the first plurality of BACnet devices to a second BBMD associated with a second subnet;

not forwarding the UDP messages for the local UDP port to the second BBMD associated with the second subnet.

6. The method according to claim 5, wherein the UDP message includes a device health message that specifies a status associated with a device.

7. The method according to claim 6, wherein the device health message includes properties that have been read from the device including at least one of: system status, last restore time, time of device restart, firmware revision, model name, vendor ID, max application protocol data unit (APDU) length, segmentation supported, max segments accepted, APDU timeout, object ID, protocol services supported, S1 active language, S1 device features, or any combination thereof.

8. The method according to claim 5, wherein a second plurality of the BACnet devices is connected to the Ethernet network and respective field devices, and each is configured with the same second subnet address and a same second local UDP port, which first and second subnet addresses are different, wherein locally broadcast messages are limited to being received by the first plurality of the BACnet devices and not the second plurality of BACnet devices, based on the same first local UDP port stored in the respective memories of the first plurality of BACnet devices, wherein the BACnet/IP UDP port is different than the local UDP port.

9. A non-transitory computer readable medium encoded with processor executable instructions that when executed by at least one processor in a BACnet device configured to communicate user datagram protocol (UDP) messages for field devices onto an Ethernet network for receipt by at least one other BACnet device on the Ethernet network, cause the at least one processor to carry out a method for isolating device communications in a BACnet over Internet Protocol (BACnet/IP) building automation network comprising:

receiving and storing in a memory a configurable local subnet, a BACnet/IP UDP port, and a local UDP port;

determining a UDP message that is to be broadcast only on the local subnet; and responsive to the determination, broadcasting the UDP message to BACnet devices on the same local subnet using the local UDP port stored in the memory, wherein the field devices correspond to at least one of heating, ventilation and air conditioning (HVAC), lighting, and/or shading equipment, further comprising:

locally broadcasting messages limited to being received by a first plurality of the BACnet devices, based on a same first local UDP port stored in the respective memories of the BACnet devices, wherein a second plurality of the BACnet devices is connected to the Ethernet network and respective field devices, and each is configured with the same second subnet address and a same second local UDP port, which first and second subnet addresses are different, wherein locally broadcast messages are limited to being received by the first plurality of the BACnet devices and not the second plurality of BACnet devices, based on the same first local UDP port stored in the respective memories of the first plurality of BACnet devices, wherein the BACnet/IP UDP port is different than the local UDP port.

10. The non-transitory computer readable medium according to claim 9, wherein the UDP message includes a device health message that specifies a status associated with a device.

11. The non-transitory computer readable medium according to claim 10, wherein the device health message includes properties that have been read from the device including at least one of: system status, last restore time, time of device restart, firmware revision, model name, vendor ID, max application protocol data unit (APDU) length, segmentation supported, max segments accepted, APDU timeout, object ID, protocol services supported, S1 active language, S1 device features, or any combination thereof.

* * * * *